(12) United States Patent
Kim et al.

(10) Patent No.: US 8,134,634 B2
(45) Date of Patent: Mar. 13, 2012

(54) LENS DRIVING UNIT AND IMAGE PHOTOGRAPHING MODULE COMPRISING THE SAME

(75) Inventors: Dae-kyung Kim, Changwon (KR); Tae-hoon Jung, Changwon (KR); In-hwan Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 398 days.

(21) Appl. No.: 12/381,198

(22) Filed: Mar. 9, 2009

(65) Prior Publication Data

US 2009/0262232 A1 Oct. 22, 2009

(30) Foreign Application Priority Data

Apr. 22, 2008 (KR) .................. 10-2008-0037314

(51) Int. Cl.
*H04N 5/225* (2006.01)
*G03B 3/10* (2006.01)

(52) U.S. Cl. ....................................... 348/340; 396/133

(58) Field of Classification Search .................... 396/72, 396/89, 133; 348/340, 373–374; 359/822; 310/311
See application file for complete search history.

(56) References Cited

U.S. PATENT DOCUMENTS

2006/0239671 A1* 10/2006 Shiraishi et al. ................. 396/89
2007/0229702 A1* 10/2007 Shirono et al. ................. 348/374
2009/0060491 A1* 3/2009 Chih .............................. 396/449

* cited by examiner

*Primary Examiner* — W. B. Perkey
*Assistant Examiner* — Minh Phan
(74) *Attorney, Agent, or Firm* — Drinker Biddle & Reath LLP (57) ABSTRACT

An image photographing module is provided that includes: a lens unit and has a guide hole guiding the movement of the lens unit; a module supporting unit disposed at the back of the lens unit along the optical axis, wherein a driving axis that is movably inserted into the guide hole is coupled to the module supporting unit; a shutter unit that controls the amount of light incident on the lens unit and is disposed in front of the lens unit such that the shutter unit is substantially included within the overall perimeter of the lens unit; and a lens driving unit that is disposed substantially within the combined perimeter of the shutter unit and the lens unit. A curved vibration piezoelectric motor is also included that moves the lens unit along the optical axis using friction with the driving axis.

14 Claims, 6 Drawing Sheets

FIG. 3A (FORWARD)
1st AXIS

2nd AXIS (BACKWARD)

LENS DRIVING UNIT AND IMAGE PHOTOGRAPHING MODULE COMPRISING THE SAME

CROSS-REFERENCE TO RELATED PATENT APPLICATION

This application claims the benefit of Korean Patent Application No. 10-2008-0037314, filed on Apr. 22, 2008 in the Korean Intellectual Property Office, the entire contents of which is incorporated herein by reference.

BACKGROUND OF THE INVENTION

1. Field of the Invention

The present invention relates to a lens driving unit and to an image photographing module having the lens driving unit. More particularly, the present invention relates to a lens driving unit including a curved vibration piezoelectric motor which is thin, has a small volume, and can perform a zooming function or an auto-focusing function in a digital camera, and to an image photographing module having the lens driving unit.

2. Description of the Related Art

In recent times, the utilization of camera modules having an auto focusing (AF) function or a zooming function in mobile electronic devices such as mobile phones has increased. Camera modules used in mobile phones should be very small and thin to allow size reduction of the mobile phones.

To perform a zooming or auto-focusing function, a lens barrel supporting a lens needs to be moved along a guide unit. Examples of driving devices in this regard are a stepping motor, a piezoelectric motor, and a ultrasonic motor. For example, a stepping motor is powered by DC and changes a continuous input pulse into a stepwise waveform. Such an arrangement has fast response characteristics when the steps are small.

However, due to the size of a deceleration gear, connection portions, and the motor itself in such arrangements, the size of a driving module is large. Also, as the number of components increase, the manufacturing cost of the camera module increases. Thus, in order to manufacture light and compact products, a ultrasonic motor or a piezoelectric motor is frequently used in a camera module for compact digital cameras or mobile phones.

In addition, a ultrasonic motor has high torque at a low driving speed, and can be manufactured in a variety of structures as compared to conventional motors.

However, in the case of a conventional lens driving unit actuated by an inertial piezoelectric motor, a piezoelectric unit needs to be disposed at a side portion of a lens module or a shutter module. As a result, the volume or width of the side portion of the camera module is increased.

Also, in the case of a conventional lens driving unit actuated by a curved vibration piezoelectric motor, a shutter module having a shutter and an aperture cannot be installed at a height almost matching an optical axis direction of a lens module due to the volume of the piezoelectric motor driving unit that is disposed in the lens module. Instead, the shutter module must be installed above the lens module in the optical axis direction. As a result, the thickness or height (length in the direction of the optical axis) of the camera module is undesirably increased.

SUMMARY OF THE INVENTION

The present invention provides a lens driving unit including a curved vibration piezoelectric motor which is thin, has a small volume, and can perform a zooming function or an auto-focusing function in a digital camera. The present invention also provides an image photographing module having the lens driving unit.

According to an embodiment of the present invention, an image photographing module is provided. The image photographing module includes: a lens unit supporting at least one lens, wherein the lens unit is movable along an optical axis of light of a subject image, and has a guide hole guiding the movement of the lens unit; a module supporting unit disposed at the back of the lens unit along the optical axis, wherein a driving axis that is movably inserted into the guide hole is coupled to the module supporting unit; a shutter unit that controls the amount of light incident on the lens unit and is disposed in front of the lens unit along the optical axis such that the shutter unit is substantially included within the overall perimeter of the lens unit along a plane parallel to the optical axis; and a lens driving unit that is disposed substantially within the combined perimeter of the shutter unit and the lens unit when viewed in the direction of the optical axis along a plane parallel to the optical axis, and coupled to the lens unit within the perimeter of the lens unit along a plane parallel to the optical axis, and includes a curved vibration piezoelectric motor that moves the lens unit along the optical axis using friction with the driving axis.

The lens unit, the module supporting unit, and the shutter unit may have an overall square form along a plane perpendicular to the optical axis. Thus, the lens driving unit may be disposed within the overall perimeter of the lens unit, which has an overall square form, along a plane perpendicular to the optical axis, and thus the width and volume of the image photographing module can be reduced.

The shutter unit may include a shutter portion that opens/closes an opening through which light of a subject image is incident, and the shutter portion may comprise a shutter film that is movable to be selectively positioned at the opening, and a shutter driving portion driving the shutter film, and the shutter driving portion may be disposed to be included substantially within the perimeter of the lens unit along the optical axis.

The shutter unit may include an aperture portion controlling the amount of incident light of a subject image, and the aperture portion may comprise an aperture film that is selectively positioned at an opening through which light is incident and an aperture driving portion driving the aperture film, and the aperture driving portion may be disposed substantially within the perimeter of the lens unit along the optical axis. Thus, along a plane perpendicular to the optical axis, most parts of the shutter unit are included within the perimeter of the lens unit, thereby reducing the thickness of the image photographing module.

The lens driving unit may further include a first pressing unit pressing the curved vibration piezoelectric motor toward the driving axis and a second pressing unit pressing the curved vibration piezoelectric motor toward the lens unit and the module supporting unit. The lens driving unit may further include a piezoelectric motor holder disposed between the lens unit and a side portion of the curved vibration piezoelectric motor. The first pressing unit may be a plate spring. The second pressing unit may be a coil spring. As the second pressing unit, which presses the curved vibration piezoelectric motor away from a first direction, is formed separately from the first pressing unit, the thickness of the lens driving unit can be reduced significantly.

The lens driving unit may further include a driving axis friction reducing unit disposed between the driving axis and the guide hole to reduce friction between the driving axis and the guide hole. The driving axis friction reducing unit may not overlap with the driving axis and the guide hole along a plane perpendicular to the optical axis. Thus, the shape of a ball guide is simple, and this makes the assembling process easy.

The module supporting unit may include an image sensor.

The curved vibration piezoelectric motor may move the driving axis in the direction of the optical axis as a tip of an end of the curved vibration piezoelectric motor close to the driving axis moves in an oval direction according to applied signals.

According to another embodiment of the present invention, a lens driving unit is provided. The lens driving unit includes: a driving axis disposed along a first direction in a guide hole formed in the lens driving unit, and moving the lens driving unit in the first direction, wherein the first direction is a direction of the optical axis of light of a subject image; a curved vibration piezoelectric motor disposed along a second direction and moving the driving axis in the first direction when a tip of an end of the curved vibration piezoelectric motor close to the driving axis moves in an oval direction according to applied signals, wherein the second direction is a direction perpendicular to the first direction; a first pressing unit pressing the curved vibration piezoelectric motor toward the driving axis; and a second pressing unit pressing the curved vibration piezoelectric motor toward a portion of the lens unit in the second direction, wherein the first pressing unit and the second pressing unit are separated from each other.

The lens driving unit may further include a driving axis friction reducing unit disposed between the guide hole and the driving axis. The driving axis friction reducing unit may not overlap with the driving axis and the guide hole along a plane perpendicular to the optical axis.

The lens driving unit may further include a friction reducing unit that is disposed opposite to the second pressing unit, having the curved vibration piezoelectric motor placed there between, and reduces friction between the curved vibration piezoelectric motor and the lens unit. The first pressing unit may be a plate spring, and the second pressing unit may be a coil spring.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which exemplary embodiments of the invention are shown.

Figure 1:
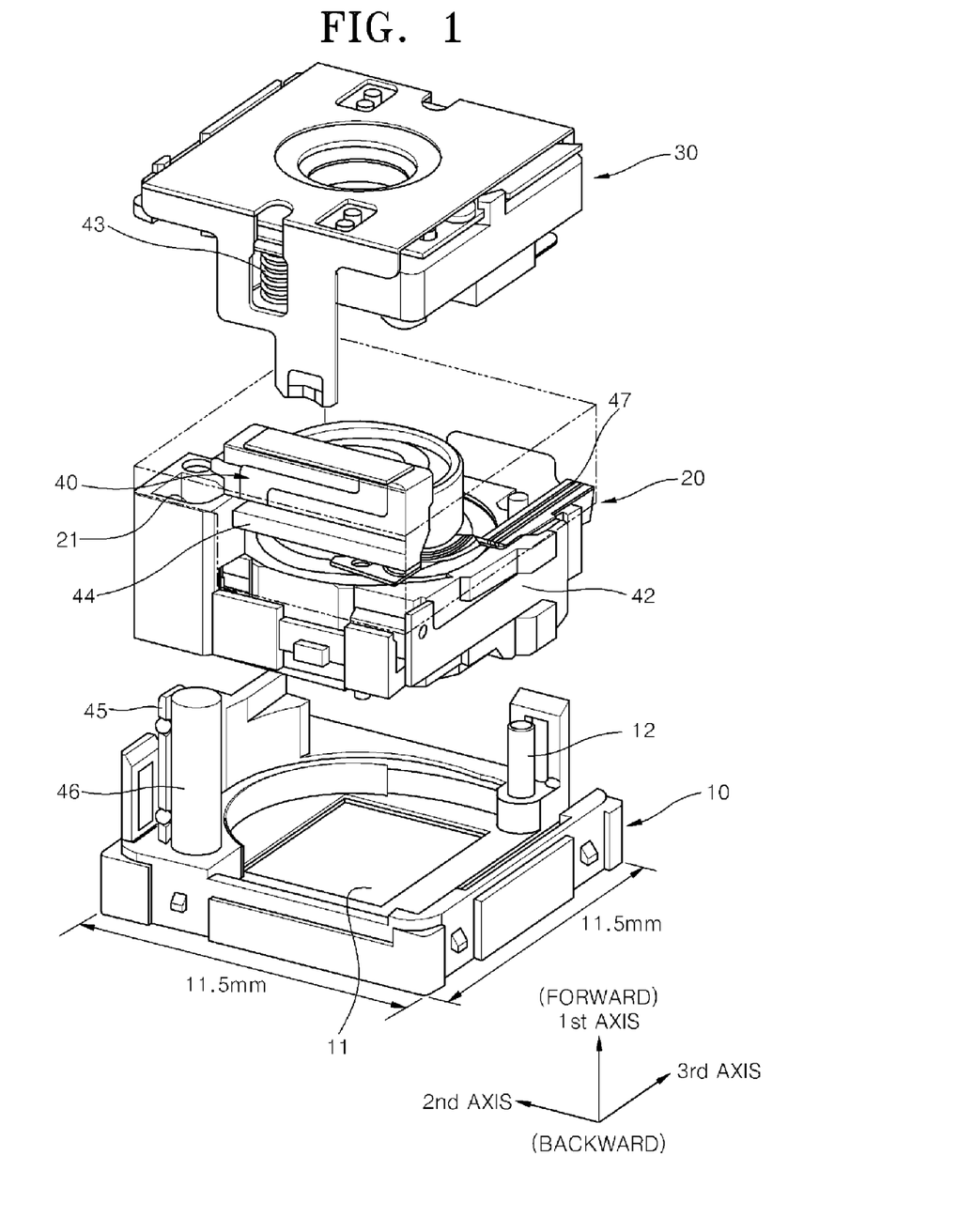
FIG. 1 is an exploded perspective view of an example of an image photographing module according to an embodiment of the present invention.
Figure 2:
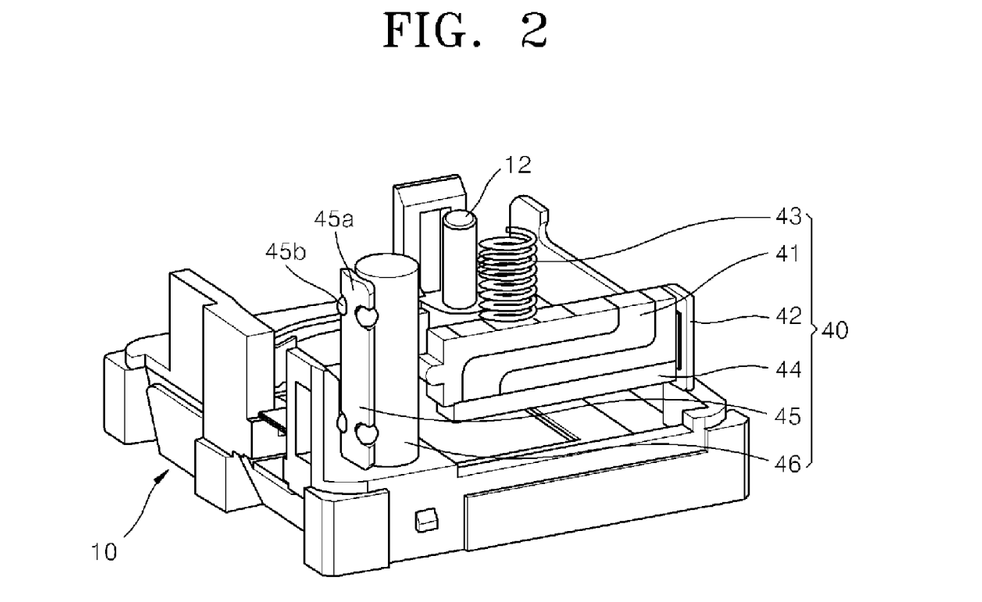
FIG. 2 is a perspective view of an example of a module supporting unit and a lens driving unit illustrated in FIG. 1.

FIG. 1 is an exploded perspective view of an example of an image photographing module according to an embodiment of the present invention. FIG. 2 is a perspective view of an example of a module supporting unit and a lens driving unit illustrated in FIG. 1. Referring to the example of FIG. 1, the image photographing module includes a module supporting unit 10, a lens unit 20, a shutter unit 30, and a lens driving unit 40.

The module supporting unit 10 may include an image sensor 11 such as a CCD (charge coupled device) sensor, a CMOS (complementary metal oxide semiconductor) sensor, or the like. The module supporting unit 10 supports the lens unit 20, the shutter unit 30, and the lens driving unit 40. A driving axis 46 may be mounted at a first corner of the module supporting unit 10, and an auxiliary axis 12 may be mounted at a second corner that is opposite to the first corner of the module supporting unit 10. However, the second corner may not be diagonally opposite to the first corner. A cross-section of the module supporting unit 10 that is perpendicular to an optical axis has an overall square form. In other words, the module supporting unit has an overall square form along a plane perpendicular to the optical axis.

The lens unit 20 supports at least one lens, and allows light of a subject image to be formed on the image sensor 11. A guide hole 21 is formed in a first corner of the lens unit 20, and an auxiliary hole (not shown) may be formed in a second corner of the lens unit. The driving axis 46 is inserted into the guide hole 21, and the auxiliary axis 12 is inserted into the auxiliary hole. The driving axis 46 guides the lens unit 20 and the shutter unit 30 along a straight line, thereby keeping the image sensor 11 always horizontal. The auxiliary axis 12 prevents rotation of the lens unit 20 and the shutter unit 30 about the module supporting unit 10. The lens unit 20 may be moved in the optical axis direction of light of a subject image along the driving axis 46. The lens unit 20 performs an auto-focusing function while being moved in a direction along the driving axis 46; the lens unit 20 may also perform a zooming function in the same way. A cross-section of the lens unit 20 that is perpendicular to the optical axis has an overall square form.

The shutter unit 30 in this example is disposed in front of the lens unit 20. The term 'front' indicates the side from which light of a subject image is coming from. The shutter unit 30 may include shutter portions 31 and 33 that block light or allow light to enter the image photographing module. The shutter unit 30 may further include aperture portions 32 and 34. The aperture portions 32 and 34 control the amount of incident light of a subject image. The shutter portions may include a shutter film 33 and a shutter driving portion 31. The shutter film 33 is formed to block or open an opening through which light is incident, and to this end, the shutter film 33 can be moved to be selectively positioned at the opening 30a. The shutter driving portion 31 drives the shutter film 33 so that the shutter film 33 blocks or opens the opening 30a. A cross-section of the shutter unit 30 that is perpendicular to the optical axis has an overall square form. In the example of FIG. 1, a region illustrated with a two-point chain line is the region where the shutter unit 30 is arranged. As will be described later in detail, most parts of the shutter unit 30 are included within the perimeter of the lens unit 20 along a plane perpendicular to the optical axis. That is, the shutter unit 30 is disposed to mostly overlap with the lens unit 20 in the direction of a first axis. Here, a first axis refers to the optical axis. Thus, the thickness and volume of the image photographing module can be reduced.

The lens driving unit 40 moves the lens unit 20 in the direction of the optical axis. The lens driving unit 40 includes a curved vibration piezoelectric motor 41, a first pressing unit 42, and a second pressing unit 43. As illustrated in FIG. 2, the curved vibration piezoelectric motor 41 is disposed perpendicular to the driving axis 46, and a tip 41a of an end of the curved vibration piezoelectric motor 41 is disposed to be near a side of the driving axis 46. The curved vibration piezoelectric motor 41 moves the lens unit 20 along the driving axis 46 using friction with the driving axis 46 such that the tip 41a moves in an oval clockwise or anti-clockwise direction.

The first pressing unit 42 is disposed at a side of the curved vibration piezoelectric motor 41 in the direction of a second axis so that the curved vibration piezoelectric motor 41 is pressed toward the driving axis 46. The first pressing unit 42 keeps the lens unit 20 fixed when the curved vibration piezoelectric motor 41 is stopped, by friction between the driving axis 46 and the tip 41a. The first pressing unit 42 may be a plate spring, for example. A first end of the first pressing unit 42 is detachably fixed to the lens unit 20, and a second end thereof contacts the curved vibration piezoelectric motor 41. Also, the first pressing unit 42 can be a plate spring, for example, and thus the space occupied by the first pressing unit 42 can be minimized.

The second pressing unit 43 is disposed at a side of the curved vibration piezoelectric motor 41 in the direction of the first axis so that the curved vibration piezoelectric motor 41 is pressed away from the first axis. The second pressing unit 43 may be a coil spring, for example. The first pressing unit 42 presses the curved vibration piezoelectric motor 41 so that uniform motion is possible per uniform pulse during winding driving of the curved vibration piezoelectric motor 41. According to the current embodiment of the present invention, the first pressing unit 42 and the second pressing unit 43 are separated from each other, and thus the space that the first pressing unit 42 and the second pressing unit 43 occupy can be efficiently reduced by disposing the second pressing unit 43 not to interfere with the shutter unit 30.

The lens driving unit 40 may further include a piezoelectric motor holder 44. The piezoelectric motor holder 44 is disposed between a side portion of the curved vibration piezoelectric motor 41 that is mounted in the lens unit 20 and the lens unit 20. The piezoelectric motor holder 44 not only supports the piezoelectric motor 41 but also reduces friction caused between a side of the curved vibration piezoelectric motor 41 and the surface of the lens unit 20 when the curved vibration piezoelectric motor 41 is driven. By installing the piezoelectric motor holder 44 only at one side of the curved vibration piezoelectric motor 41 in the direction of the lens unit 20, the volume of the lens driving unit 40 can be reduced.

The lens driving unit 40 may further include a driving axis friction reducing portion 45. The driving axis friction reducing portion 45 is disposed between the driving axis 46 and the guide hole 21 so as to reduce friction between the driving axis 46 and the guide hole 21 that is generated when the curved vibration piezoelectric motor 41 drives the driving axis 46. The driving axis friction reducing portion 45 can have various structures. As illustrated in the example of FIG. 2, the driving axis friction reducing portion 45 is a ball guide including four balls 45b and a curved plate 45a. The ball guide 45 converts a surface contact between the driving axis 46 and the guide hole 21 into a point contact, thereby reducing friction. No curved portion is formed at both ends of the curved plate 45a in the first axis direction. That is, when seen along a plane that is perpendicular to the optical axis, the driving axis friction reducing portion 45 does not overlap with the driving axis 46 and the guide hole 21. Accordingly, the ball guide 45 has a simple form and thus can be easily assembled. A flexible printed circuit board (FPCB) may be disposed at a front side of the first axis of the curved vibration piezoelectric motor 41, and an electric signal that drives the curved vibration piezoelectric motor 41 is supplied through the FPCB 47 (FIG. 1).

Figure 3A:
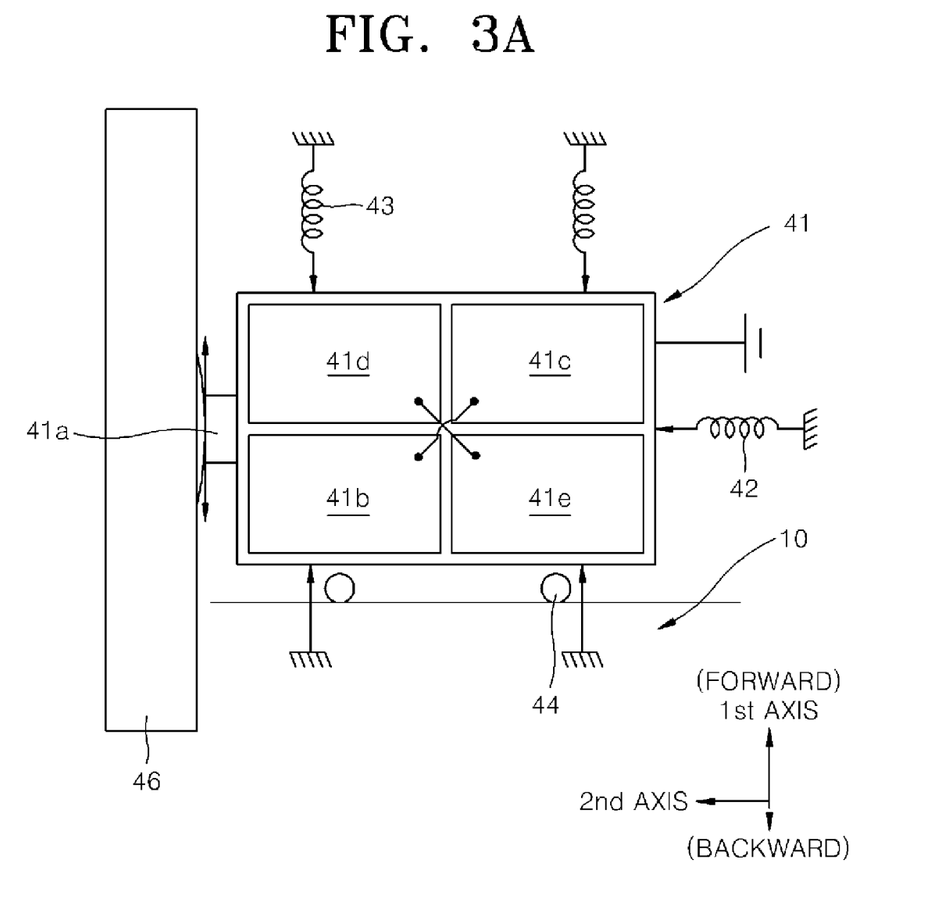
FIG. 3A is a schematic view of an example of a curved vibration piezoelectric motor of the lens driving unit, according to an embodiment of the present invention.
Figure 3B:
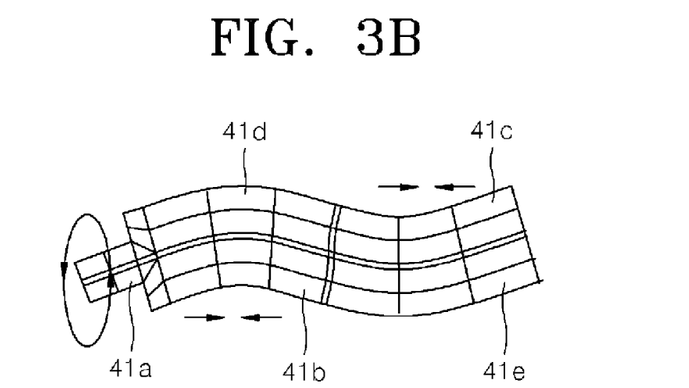
FIG. 3B is a schematic view for illustrating an example of the operational principle of the curved vibration piezoelectric motor of FIG. 3A.

FIG. 3A is a schematic view of an example of the curved vibration piezoelectric motor 41 of the lens driving unit according to an embodiment of the present invention. FIG. 3B is a schematic view for explaining an example of the operational principle of the curved vibration piezoelectric motor 41 of FIG. 3A.

Referring to the example of FIG. 3A, a main body of the curved vibration piezoelectric motor 41 includes a piezoelectric ceramic and a first pair of electrodes 41b and 41c and a second pair of electrodes 41d and 41e. The pairs of electrodes 41b and 41c and the electrodes 41d and 41e are disposed diagonally on the piezoelectric ceramic. A tip 41a is disposed at an end of a side of the curved vibration piezoelectric motor 41 in the second axis direction. The tip 41a is disposed very close to the driving axis 46 or contacts the driving axis 46. A first pressing unit 42 is disposed at an end of the other side of the curved vibration piezoelectric motor 41 in the second axis direction. A second pressing unit 43 is disposed at an end of the curved vibration piezoelectric motor 41 in the first axis direction. A motor friction reducing unit 44 may be disposed between the end of the other side of the curved vibration piezoelectric motor 41 in the first axis direction and the lens unit 20. In FIG. 1, the motor friction reducing unit 44 is the piezoelectric motor holder 44.

An alternating current having a sine wave shape is selectively applied to the first pair of the electrodes 41b and 41c or the second pair of the electrodes 41d and 41e. For example, when a sine wave voltage, for example, a positive voltage, is applied to the first pair of the electrodes 41b and 41c during a first half period as illustrated in the example of FIG. 3B, only a portion of the piezoelectric ceramic corresponding to the first pair of the electrodes 41b and 41c contracts (or expands). Consequently, the piezoelectric ceramic is transformed in a wavelike manner. In contrast, when a sine wave voltage, for example, a negative voltage, is applied to the first pair of the electrodes 41b and 41c for the next half period, the piezoelectric ceramic corresponding to the first pairs of the electrodes 41b and 41c expands (or contracts).

Consequently, the piezoelectric ceramic is transformed in a wavelike manner in the opposite direction to that of the previous half period. Thus, as an alternating current is continuously applied to the pair of the electrodes 41b and 41c, the piezoelectric ceramic vibrates in a wavelike manner, and the tip 41a of the piezoelectric ceramic is moved in an oval anti-clockwise direction. Then the tip 41a of the piezoelectric ceramic pulls the driving axis 46 downward, and thus by a counter reaction force, the curved vibration piezoelectric motor 41 and the lens unit 20 having the curved vibration piezoelectric motor 41 is moved to the front of the first axis. Also, the shutter unit 30 is also moved together with the lens unit 20.

Similarly, when a sine wave voltage is applied to the second pair of the electrodes 41d and 41e, the piezoelectric ceramic vibrates in a wavelike manner in the opposite direction to that of the example of FIG. 3B. Accordingly, the tip 41a of the piezoelectric ceramic is moved in an oval anti-clockwise direction. Then the tip 41a of the piezoelectric ceramic pulls the driving axis 46 upward, and thus by a counter reaction force, the curved vibration piezoelectric motor 41 and the lens unit 20 having the curved vibration piezoelectric motor 41 are moved away from the first axis.

Figure 4:
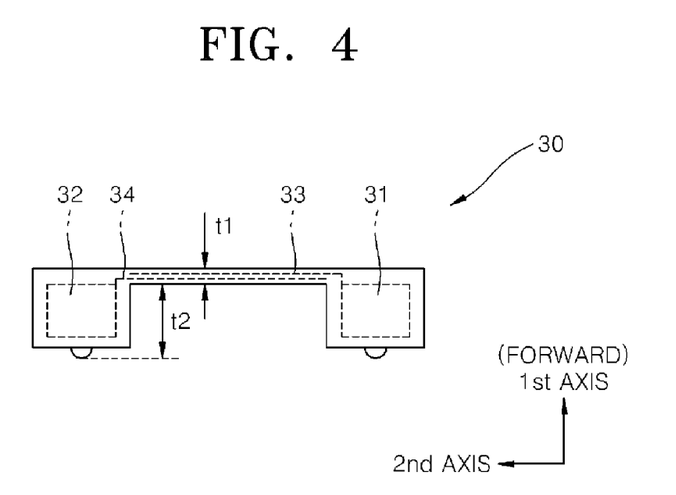
FIG. 4 is a side view of an example of a shutter unit illustrated in FIG. 1.
Figure 5:
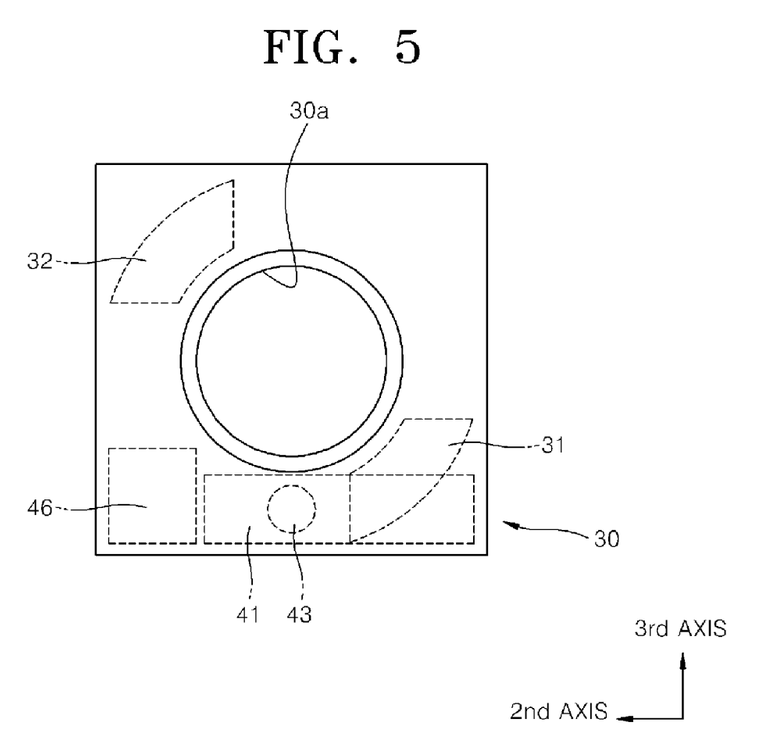
FIG. 5 is a plan view of an example of a the shutter unit illustrated in FIG. 1.

FIGS. 4 and 5 are respectively a side view and a plan view of an example of the shutter unit 30 illustrated in FIG. 1. Referring to the example of FIG. 4, if the shutter unit 30 includes all of the shutter portions 31 and 33 and the aperture portions 32 and 34, the shutter film 33 and the aperture film 34 are disposed at a small distance there between so as not to overlap each other. Referring to the example of FIG. 5, the shutter driving portion 31 and the aperture driving portion 32 are disposed opposite to each other in a diagonal direction so as not to interfere with the driving axis 46. Also, the shutter driving portion 31 and the aperture driving portion 32 are disposed not to interfere with the second pressing unit 43 either. When seen along a plane perpendicular to the first axis, the lens driving unit 40 including the curved vibration piezoelectric motor 41 is disposed within the overall perimeter of the lens unit 20. Accordingly, the volume of side portions of the image photographing module is not increased, and thus a cross-section of the entire image photographing module that is perpendicular to the second axis has an overall square form.

Figure 6:
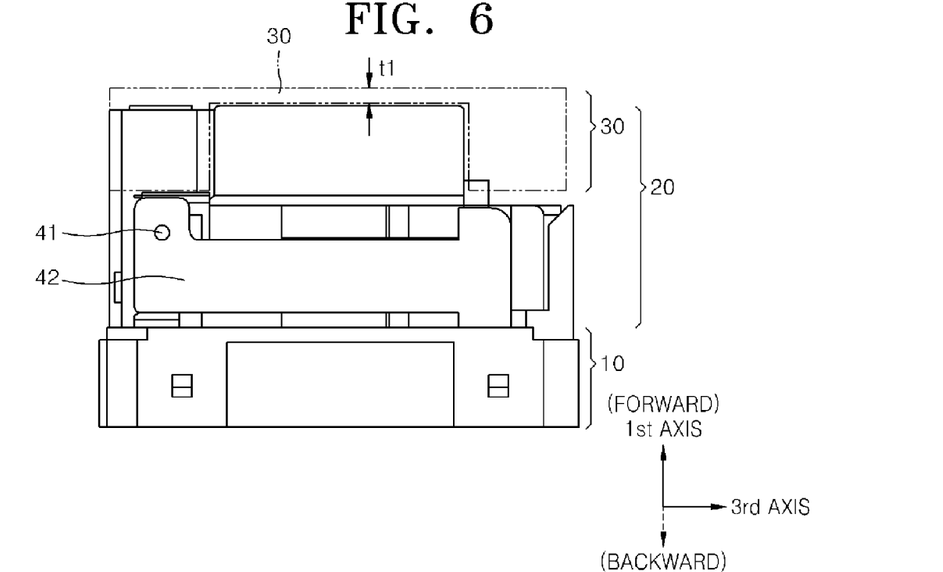
FIG. 6 is a front view of an example of an image photographing module according to an embodiment of the present invention.

FIG. 6 is a front view of an example of an image photographing module according to an embodiment of the present invention. In the example of FIG. 6, a two-point chain line denotes a region in which the shutter unit 30 is mounted. Seen along a plane that is parallel to the first axis and perpendicular to the second axis (that is, a plane formed by the first axis and the third axis), the shutter unit 30 is disposed substantially within the overall perimeter of the lens unit 20 along the first axis. Here, that the shutter unit 30 is disposed substantially within the perimeter of the lens unit 20 along the first axis means that most parts of the shutter unit 30 are included within the perimeter of the lens unit 20 along the first axis; in detail, this means that the shutter driving portion 31 and the aperture driving portion 32 of the shutter unit 30 are disposed within the perimeter of the lens unit 20 in the direction of the first axis, and the other parts of the shutter unit 30, that is, the shutter film 33 and the aperture film 34, are disposed outside the perimeter of the lens unit 20 in the direction of the first axis.

Figure 7:
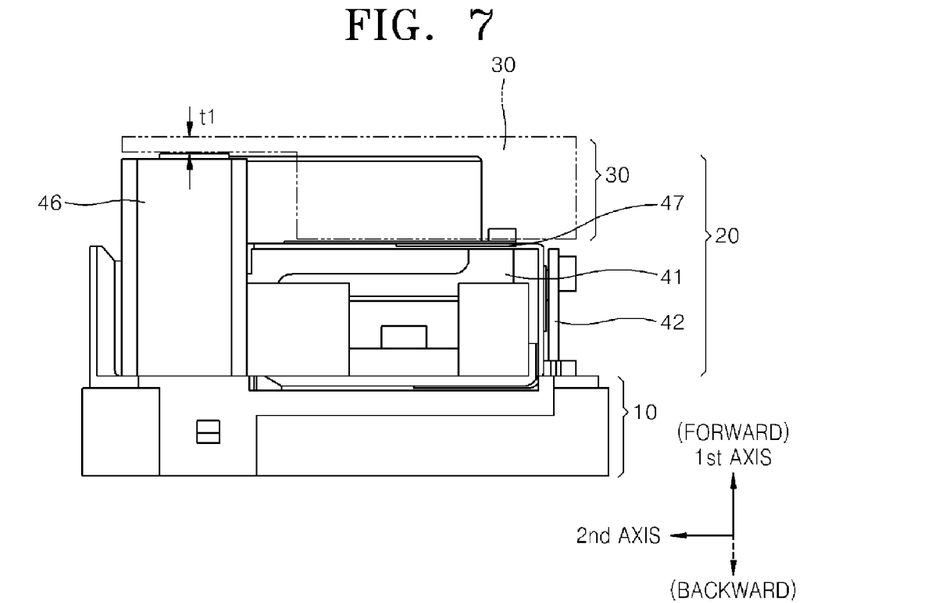
FIG. 7 is a side view of an example of the image photographing module illustrated in FIG. 6.

A thickness t2 of the shutter driving portion 31 and the aperture driving portion 32 is about 2.5 mm, whereas a thickness t1 of the shutter film 33 and the aperture film 34 is about 0.4 mm. Accordingly, the shutter driving portion 31 and the aperture driving portion 32 which occupy about 85% of the entire thickness of the shutter unit 30 are disposed within the perimeter of the lens unit 20 in the direction of the first axis, and the thickness of the shutter unit 30 can be reduced by the thickness t2 (see FIG. 4) and the volume thereof can be reduced accordingly. FIG. 7 is another side view of an example of the image photographing module illustrated in FIG. 6. As illustrated in FIG. 7, most of the parts of the shutter unit 30 are disposed so as to be within the overall perimeter of the lens unit 20.

To this end, according to the current embodiment of the present invention, the number of units pressing the curved vibration piezoelectric motor 41 is minimized, and the arrangement and shape of these units are optimized. More particularly, to press the curved vibration piezoelectric motor 41 toward the driving axis 46 in the second axis direction and toward the lens unit 20 in the first axis direction, only the first and second pressing units 42 and 43 are utilized. In particular, by separately forming the second pressing unit 43 that presses the piezoelectric motor 41 away from the first direction, from the first pressing unit 42, the thickness of the lens driving unit 40—the length in the first axis direction—can be greatly reduced. Moreover, as illustrated in the example of FIG. 5, the second pressing unit 43 is disposed so as not to overlap with the shutter unit 30, particularly so as not to overlap with the shutter driving portion 31. Accordingly, as illustrated in the example of FIG. 6, most of the parts of the shutter unit 30 are disposed so as to be within the overall perimeter of the lens unit 20, and thus the thickness of the image photographing module can be reduced.

Figure 8:
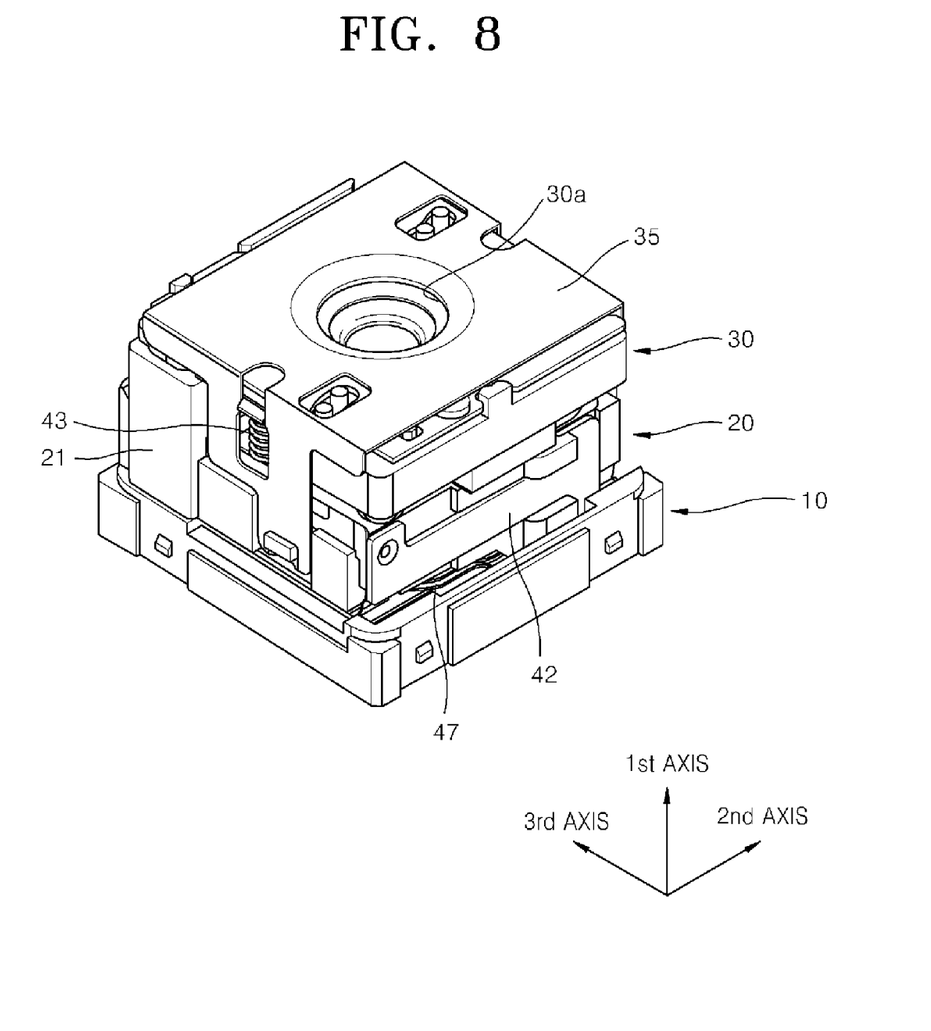
FIG. 8 is a perspective view of an example of an image photographing module according to an embodiment of the present invention.

FIG. 8 is a perspective view of an example of an image photographing module according to an embodiment of the present invention. Accordingly, as illustrated in the example of FIG. 8, a compact image photographing module can be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image photographing module comprising:
   a lens unit supporting at least one lens,
      wherein the lens unit is movable along an optical axis of light of a subject image, and has a guide hole guiding the movement of the lens unit;
   a module supporting unit disposed at the back of the lens unit along the optical axis,
      wherein a driving axis that is movably inserted into the guide hole is coupled to the module supporting unit;
   a shutter unit that controls the amount of light incident on the lens unit and is disposed in front of the lens unit along the optical axis such that the shutter unit is substantially included within the overall perimeter of the lens unit along a plane parallel to the optical axis;
   a lens driving unit that is disposed substantially within the shutter unit or the lens unit when viewed along a plane perpendicular to the optical axis, and coupled to the lens unit within the perimeter of the lens unit along a plane parallel to the optical axis, and includes a curved vibration piezoelectric motor that moves the lens unit along the optical axis using friction with the driving axis;
   a ball guide disposed between the driving axis and the guide hole to reduce friction between the driving axis and the guide hole;
   wherein the ball guide comprises a curved plate and a plurality of balls and
   a coil spring pressing on a single point of the curved vibration piezoelectric motor toward the lens unit and the module supporting unit, the single point being proximate to the driving axis.

2. The image photographing module of claim 1, wherein the lens unit, the module supporting unit, and the shutter unit have an overall square form along a plane perpendicular to the optical axis.

3. The image photographing module of claim 1, wherein the shutter unit comprises a shutter portion that opens/closes an opening through which light of a subject image is incident, and
   the shutter portion comprises a shutter film that is movable to be selectively positioned at the opening, and a shutter driving portion driving the shutter film, and
   the shutter driving portion is disposed to be included substantially within the perimeter of the lens unit along the optical axis.

4. The image photographing module of claim 1, wherein the shutter unit comprises an aperture portion controlling the amount of incident light of a subject image and comprising an aperture film that is selectively positioned at an opening through which light is incident and an aperture driving portion driving the aperture film, and
    wherein the aperture driving portion is disposed substantially within the perimeter of the lens unit along the optical axis.

5. The image photographing module of claim 1, wherein the lens driving unit further comprises a first pressing unit pressing the curved vibration piezoelectric motor toward the driving axis.

6. The image photographing module of claim 5, wherein the lens driving unit further comprises a piezoelectric motor holder disposed between the lens unit and a side portion of the curved vibration piezoelectric motor, and the coil spring presses the curved vibration piezoelectric motor toward the piezoelectric motor holder.

7. The image photographing module of claim 5, wherein the first pressing unit is a plate spring.

8. The image photographing module of claim 1, wherein the ball guide does not overlap with the driving axis and the guide hole along a plane perpendicular to the optical axis.

9. The image photographing module of claim 1, wherein the curved vibration piezoelectric motor moves the driving axis in the direction of the optical axis as a tip of an end of the curved vibration piezoelectric motor close to the driving axis moves in an oval direction according to applied signals.

10. The image photographing module of claim 1, wherein the module supporting unit comprises an image sensor.

11. The image photographing module of claim 1, wherein the lens driving unit is disposed within the overall perimeter of the lens unit.

12. A lens driving unit comprising:
    a driving axis disposed along a first direction in a guide hole formed in the lens driving unit, and moving the lens driving unit in the first direction,
    wherein the first direction is a direction of the optical axis of light of a subject image;
    a curved vibration piezoelectric motor disposed along a second direction and moving the driving axis in the first direction when a tip of an end of the curved vibration piezoelectric motor close to the driving axis moves in an oval direction according to applied signals,
    wherein the second direction is a direction perpendicular to the first direction;
    a first pressing unit pressing the curved vibration piezoelectric motor toward the driving axis;
    a coil spring pressing on a single point of the curved vibration piezoelectric motor toward a portion of the lens unit in the second direction, the single point proximate to the driving axis,
    wherein the first pressing unit and the coil spring are separated from each other; and
    a ball guide disposed between the driving axis and the guide hole to reduce friction between the driving axis and the guide hole wherein the ball guide comprises a plurality of balls.

13. The lens driving unit of claim 12, wherein the ball guide does not overlap with the driving axis and the guide hole along a plane perpendicular to the optical axis.

14. The lens driving unit of claim 12, wherein the first pressing unit is a plate spring.

* * * * *